T. D. BUDD.
BEE SECTION.
APPLICATION FILED JULY 13, 1914.
1,171,501. Patented Feb. 15, 1916.
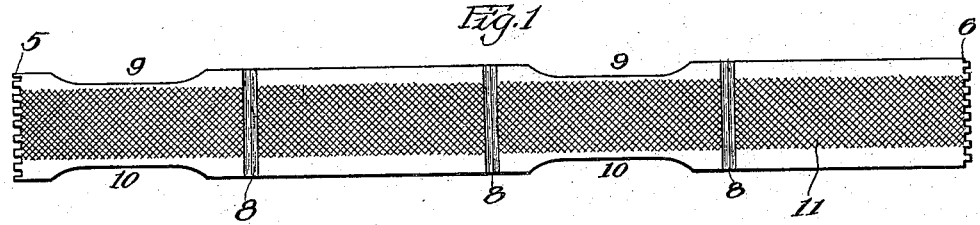
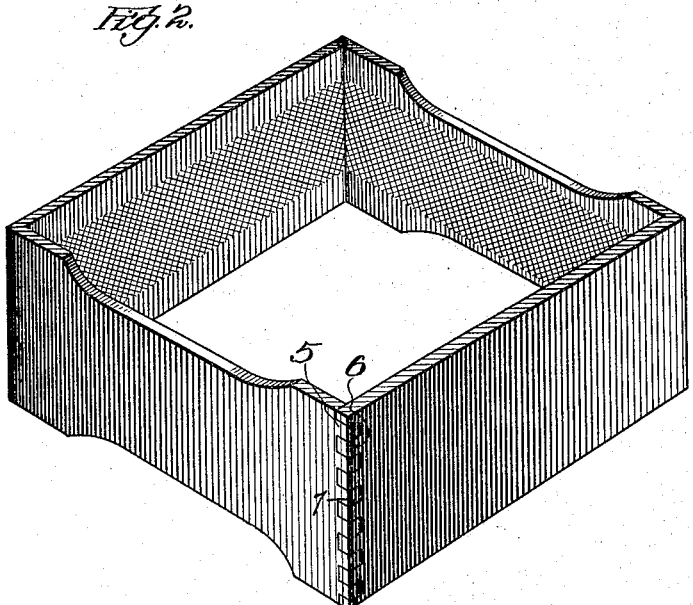
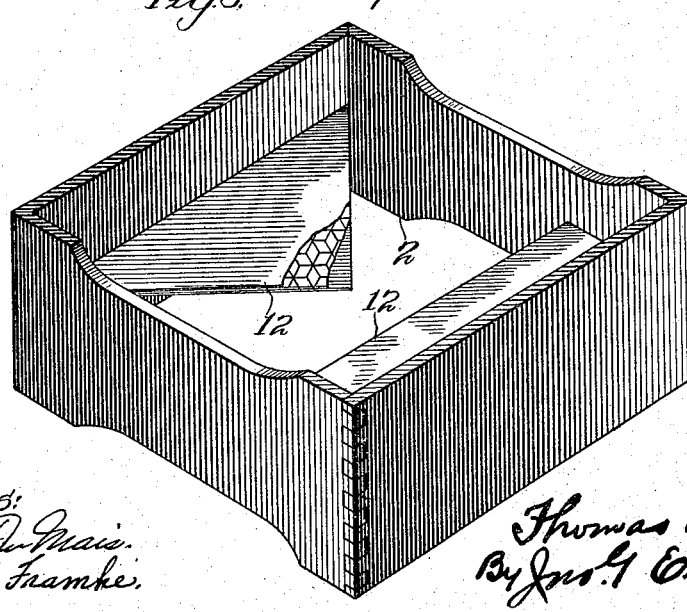
Witnesses:
Leo J. Du Mais.
Arthur B. Framke.
Inventor:
Thomas D. Budd
By Jno. G. Elliott
Atty.

UNITED STATES PATENT OFFICE.

THOMAS D. BUDD, OF LA CROSSE, WISCONSIN.

BEE-SECTION.

1,171,501. Specification of Letters Patent. Patented Feb. 15, 1916.

Application filed July 13, 1914. Serial No. 850,575.

*To all whom it may concern:*

Be it known that I, THOMAS D. BUDD, a citizen of the United States, and resident of La Crosse, in the county of La Crosse and State of Wisconsin, have invented certain new and useful Improvements in Bee-Sections, of which the following is a full, clear, and exact specification.

This invention relates to improvements in bee sections consisting of an open frame commonly formed from a thin strip of wood about 17 inches long and 2 inches wide provided with transverse grooves and provided at its opposite ends with interlocking notches or tongues, which strip, following its moistening at the notches is thereupon bent to form with its ends interlocked at one corner to form a section about 4 inches square and of which a number of such sections are removably supported and suspended by any suitable means in a bee hive and removed therefrom for shipment to the market as soon as possible after being filled with comb and honey by the bees as far as may be.

There is probably no form of receptacle for comb honey more desirable of use than a bee section such as above referred to, for the reason that it is cheap and strong of construction, convenient of handling for inserting it in and when filled as far as may be, taking it from a bee hive; that such a section may be made of a size predetermining the weight of honey to be contained therein when filled, and that these receptacles are convenient of shipment and furnish the best possible means for exposing the honey on the market to would be purchasers. A further advantage in the use of bee sections is that they provide a means by which there may be maintained at all times in a bee hive sufficient store-room to prevent undesirably frequent swarming of the bees. Heretofore, however, it has been found in practice that honey bees do not take kindly to bee sections, and this seemingly because of their disinclination to apply to the wood surface of the sections the wax necessary for the subsequent attachment of the honey comb thereto, the evidence of which is that when they do use a section, it is an exceptional instance when there are not several spaces left between the edges of the comb and the surface of the section, and even rarer when any substantial portion of these edges are secured for their full width to the section with the result that the comb breaks away from the section in handling, and as frequently in transit that many apiarists have discarded the use of bee sections notwithstanding the desirability before pointed out.

The object of my invention is not only to make a bee section attractive to honey bees for laying up their store of comb and honey therein, and at the same time to provide a means by which the bees will be induced, and in a sense compelled by their nature to secure their comb continuously to the inner surface of the section, but for the full width of these sides, and whereby comb honey is so firmly secured to the surface of all four sides of the sections, that under the ordinary practice followed in handling and shipping, comb honey will not fall out of or any portion of it be broken away from the section, and will reduce breakage to a minimum.

More specifically stated the object of my invention is a bee section provided with a coating of wax manually or mechanically applied thereto in such a manner that the coating of wax shall be continuous upon all four of the inner sides of the section, whereby the bees will be induced, and by their nature compelled to attach the honey comb to the continuous inner face of the frame, and for the full width of all four sides of the section.

With these ends in view, my invention finds embodiment in its application to the bee sections illustrated in the accompanying drawing, all as fully described with reference thereto and particularly pointed out in the claims.

In said drawing: Figure 1 represents a plan view of a blank of wood from which bee sections are formed in which my invention finds embodiment. Fig. 2 is a perspective view of a complete bee section formed from said blank showing the interlocking means therefor, and Fig. 3 is a similar view showing the attachment to a bee section of a comb foundation.

Similar characters of reference indicate the same parts in the several figures of the drawing.

The blank 4 as usually constructed commonly consists of a wood strip about one-eighth of an inch thick, two inches wide and about sixteen and three-fourths inches in length, which when folded forms a bee section four and one-quarter inches by four and one-quarter inches (outside) and containing, when well filled about a pound of comb honey. This strip is provided at its respective ends with tongues and grooves 5 and 6 forming an interlocking joint 7 at one corner of the section of the box formed therefrom, the strip being provided at intervals of its length with transverse notches 8, deep enough to leave a thin film of wood connection, so thin in fact that when moistened the several sections of the strip may without breaking be folded to the form of a square section. The alternate strip sections formed by the grooves being each slightly cut away at their opposite edges as indicated at 9 and 10, to form passages between the sections for the bees.

The length of the strip or blank for bee sections differ in accordance with the desired size of the section to be formed therefrom, and they usually consist of basswood of a fine velvety fiber without knots, planed to a smoothness, but so far as my invention is concerned may be of other wood and formed therefrom in any manner heretofore employed especially in view of the fact that the material and means of joining a bee section forms no part of my invention, and the form herein shown is only for the purpose of indicating the application of my invention to bee sections generally, and to which it is applicable.

My invention finds embodiment in a bee section which has applied thereto manually by means of a brush, or by dipping or mechanically by means, for example, of a roller a continuous layer, and preferably a thin film of wax around the entire inner surface of the bee section, which in practice, however, consists of a ribbon-like layer or film 11, of a width conforming to the usual width of a honey comb, that is to say a layer or film of wax about one and three-eighths of an inch wide, in section shown in drawing, and therefore narrower than the transverse width of the strip from which the bee section is formed, the transverse center of which corresponds with that of the transverse center of the strip and of the sides of the bee section, thereby leaving about three-sixteenths of an inch of the strip or side section unwaxed at each side of the layer or film of wax, with the result that the bee comb will be centered as it were in the section, when other sizes of sections are used the coating or ribbon of wax can be applied any desired width.

The wax forming the coating or film should be pure bees wax, practice having shown it to be more acceptable to the bees than an impure bees wax, other waxes or their compounds, and furthermore, that bees wax when applied somewhat heated penetrates the wood and is thereby held by its fibers in such a manner as to afford better and stronger hold for supporting the weight of the honey filled comb in handling and in transit.

Bees wax should be in a more or less heated condition when applied, and while it may be applied by means of a brush to the strip, or to the section after being formed from the strip, I find that a better and more satisfactory application of the wax may be made by means of a roller dipping in heated wax and applied with some pressure to the strip before it is bent to form a section. In other words by the use of a roller the strips may be very quickly and perfectly provided with a thin ribbon of wax uniformly and accurately located, and which not only effects a saving of time, but permits the employment of a minimum amount of wax and yet all that is necessary for inducing honey bees to not only unhesitatingly form and attach honey comb thereto, but to and over the entire waxed surface of a bee section.

Repeated practice has demonstrated that bee sections provided with a layer or film of wax, as above described, are very acceptable to bees for they unhesitatingly attach their comb for its full thickness to and without leaving any openings between the comb and the sides of the section; that they also apply wax to and tightly secure the interlocked ends of a section together, and moreover that honey bees are not only induced to fill the section with a perfect comb, but to fill the comb in its entirety with honey, which not only insures a full weight of comb honey to a section, but thereby makes the section accordingly attractive and salable.

When it is desired to use a comb foundation such for example, as illustrated at 12 in Fig. 3 of the drawing, consisting of a sheet of wax artificially compressed to a form simulating that otherwise produced by honey bees, the waxed layer or strip on the bee section furnishes a convenient and effective means for securing the comb foundation to the section in its operative position on simply pressing one or more of the edges of the foundation against the wax layer or film on the section, or after slightly heating the edge or edges of the foundation.

For securing the foundation to the frame it is only necessary that there should be sufficient adherence between the wax on the frame and the foundation to insure maintaining the latter in its operative position until the bees shall have had sufficient time and opportunity to secure, as they will, any unattached portion of the foundation thereto. In this connection it is proper to observe that these comb foundations may be triangular in form with but one edge thereof secured to and suspended from and along the central line of the section as shown in Fig. 3, although it is not uncommon to have these foundations in rectangular pieces secured to one side of the bee section, their purpose being like the waxing of the inner surface of the sections, to save the bees time and labor in forming and attaching their comb to the section and induce them to furnish the sections with comb honey.

Having described my invention what I claim and desire to secure by Letters Patent is:

1. A bee section the inner surface of which is provided with a coating or continuous film of wax manually or mechanically spread thereon in adhesive contact therewith.

2. A bee section, the inner surface of which is provided with a coating or continuous film of wax, manually or mechanically spread thereon and incorporated with the fibers opposed thereto.

3. A bee section, the inner surface of which is provided with a continuous layer or film of wax spread thereon to correspondence in width with the thickness of comb subsequently formed and attached thereto by honey bees.

4. A bee section, the inner surface of which is provided with a continuous layer or film of beeswax spread thereon of less width than the width of the frame and located at a point removed from both edges thereof.

5. A bee section formed from a strip having thereon a layer or film of beeswax continously extending from end to end thereof, having tongued and grooved ends, and thereafter bent and interlocked to form said section.

In witness whereof, I have hereunto set my hand and affixed my seal, this 7th day of July, A. D. 1914.

THOMAS D. BUDD. [L. S.]

Witnesses:
ROBERT B. LOWRY,
JNO. P. GOHRES.

Copies of this patent may be obtained for five cents each, by addressing the "Commissioner of Patents, Washington, D. C."